(12) United States Patent
Kojima

(10) Patent No.: US 6,633,293 B1
(45) Date of Patent: Oct. 14, 2003

(54) IMAGE PROCESSING METHOD AND APPARATUS, AND STORAGE MEDIUM THEREFOR

(75) Inventor: Hideo Kojima, Tokyo (JP)

(73) Assignee: Konami Co., Ltd. (JP)

( * ) Notice: Subject to any disclaimer, the term of this patent is extended or adjusted under 35 U.S.C. 154(b) by 0 days.

(21) Appl. No.: 09/224,775

(22) Filed: Jan. 4, 1999

(30) Foreign Application Priority Data

Jan. 5, 1998 (JP) .......................................... 10-000410

(51) Int. Cl.$^7$ ............................................. G06T 13/00
(52) U.S. Cl. ...................................................... 345/473
(58) Field of Search ................................ 345/473, 723; 463/31, 43

(56) References Cited

U.S. PATENT DOCUMENTS

| | | | | |
|---|---|---|---|---|
| 5,442,744 A | * | 8/1995 | Piech et al. ................... | 395/154 |
| 5,607,356 A | * | 3/1997 | Schwartz ...................... | 463/31 |
| 5,610,653 A | | 3/1997 | Abecassis | |
| 5,649,862 A | * | 7/1997 | Sakaguchi et al. ............. | 463/44 |
| 5,729,471 A | * | 3/1998 | Jain et al. ..................... | 364/514 |
| 5,752,883 A | * | 5/1998 | Butcher ......................... | 463/43 |
| 5,769,718 A | * | 6/1998 | Rieder ........................... | 463/31 |
| 5,830,066 A | * | 11/1998 | Goden et al. .................. | 463/33 |
| 5,892,507 A | * | 4/1999 | Moorby et al. ................ | 345/302 |
| 5,954,332 A | * | 9/1999 | Mero et al. .................... | 273/236 |
| 6,126,544 A | * | 10/2000 | Kojima ........................... | 463/31 |

FOREIGN PATENT DOCUMENTS

| | | |
|---|---|---|
| EP | 0 661 658 | 7/1995 |
| EP | 0 797 206 | 11/1998 |
| JP | H8-279058 | 10/1996 |

* cited by examiner

*Primary Examiner*—Mark Zimmerman
*Assistant Examiner*—Huedung X. Cao
(74) *Attorney, Agent, or Firm*—Lerner, David, Littenberg, Krumholz & Mentlik, LLP

(57) ABSTRACT

A plurality of presentation expressing data produced by different directors according to one game scenario are stored so as to correspond to progress data of the game scenario and identification data of the directors. When one of the directors is selected by a game player, the corresponding presentation expressing data is read out using the identification data of the selected director. CG images are produced based on the read-out presentation expressing data and displayed. If the game player selects another director during the progress of the game scenario, the corresponding presentation expressing data is read out so that CG images are produced based on the presentation expressing data of the different director and displayed.

47 Claims, 4 Drawing Sheets

IMAGE PROCESSING METHOD AND APPARATUS, AND STORAGE MEDIUM THEREFOR

BACKGROUND OF THE INVENTION

1. Field of the Invention

The present invention relates to an image processing technique which is applied to a video game apparatus, a reproducing apparatus of a CG (Computer Graphic) movie, or the like.

2. Description of the Related Art

In recent years, role-playing games have been actively developed, wherein, for example, a player operates behavior of a player character appearing in a game so that the player character fights a counterpart character, or a player grows up a player character in a game. In recent video game apparatuses, entertainment factors are enhanced by, not only operating behavior of a character, but also making a game itself storyful as well as using a three-dimensional CG image processing technique to produce game images in which characters, background environments, etc. move and change realistically. Further, it has also been attempted to produce CG movies using the three-dimensional CG image processing technique.

In general, the CG images to be used for those purposes are produced based on data which are prepared by a director or a person in charge under the direction of the director according to a scenario for specifying expressing manners of characters, background environments, etc. This is like a film director takes a motion picture by, for example, instructing behavior and expression to actors and actresses, utilizing cameraworks, such as changing a camera position and zooming, and using lighting and properties for enhancing presentation effects.

As described above, the CG images to be used in the storyful video game apparatus or the CG movie are produced under the direction of a director according to a certain scenario. It is often experienced that even if a scenario is the same, the presentation effects, such as the camerawork effect and the property effect, for images thus produced differ depending on directors so that different impressions are given to a viewer.

In the conventional video game apparatus or the CG movie, however, there are provided only those CG images which were produced under the direction of one director, so that a consumer has no option but to buy such a video game apparatus or CG movie.

SUMMARY OF THE INVENTION

Therefore, it is an object of the present invention to provide an image processing method which can diversify image expressing manners to, for example, enhance attraction for a game or a CG movie.

It is another object of the present invention to provide an image processing apparatus for carrying out the foregoing image processing method.

It is another object of the present invention to provide a video game apparatus for carrying out the foregoing image processing method.

It is another object of the present invention to provide a storage medium for realizing the foregoing image processing method, the foregoing image processing apparatus or the foregoing video game apparatus using a computer.

According to one aspect of the present invention, there is provided an image processing method comprising the steps of storing a plurality of presentation expressing data for performing image presentation expressions of different features relative to one scenario, the plurality of presentation expressing data being linked with time element data relating to the progress of the scenario; selectively reading out one of the plurality of presentation expressing data when displaying an image according to the progress of the scenario; and performing the image presentation expression relative to the image based on the read-out presentation expressing data.

It may be arranged that the plurality of presentation expressing data are stored in an exchangeable portable memory.

It may be arranged that the plurality of presentation expressing data are further linked with identification data of directors who are producers of the image presentation expressions, and that the image processing method further comprises the step of displaying an image for selecting introduction data about a presentation feature of one of the directors and selecting the identification data of one of the directors.

It may be arranged that the plurality of presentation expressing data are switched from one to another corresponding to a plurality of scenario scenes of the scenario, and that correspondence between each of the scenario scenes and one of the plurality of presentation expressing data is preset.

It may be arranged that each of the plurality of presentation expressing data comprises a program for moving or changing a shape of a polygon, expression data of the polygon and variation data of the polygon and is linked with the time element data and identification data of corresponding one of directors who are producers of the image presentation expressions.

It may be arranged that the scenario is a game scenario whose progress is stopped or restarted by a game player, and that the game scenario is restarted based on one of the plurality of presentation expressing data which was read out when the progress of the game scenario was stopped.

It may be arranged that the scenario is a movie scenario, and wherein the image is a pseudo motion image, which is not operable afterward, produced according to the movie scenario.

According to another aspect of the present invention, there is provided an image processing method comprising the steps of storing a plurality of presentation expressing data for performing image presentation expressions of different features relative to one scenario, the plurality of presentation expressing data being linked with time element data relating to the progress of the scenario; reading out one of the plurality of presentation expressing data when displaying an image according to the progress of the scenario; performing the image presentation expression relative to the image based on the read-out presentation expressing data; reading out another of the plurality of presentation expressing data when displaying another image according to the progress of the scenario; and performing the image presentation expression relative to the another image based on the read-out another presentation expressing data.

According to another aspect of the present invention, there is provided an image processing apparatus comprising a data storing section which stores a plurality of presentation expressing data for performing image presentation expressions of different features relative to one scenario, the plurality of presentation expressing data being linked with identification data of directors who are producers of the image presentation expressions and with time element data relating to the progress of the scenario; a data reading section which, using the identification data of one of the directors as key data, reads out corresponding one of the plurality of presentation expressing data from the data storing section; and a section which produces a CG image based on the corresponding presentation expressing data read out by the data reading section, and displays the produced CG image on a display unit, wherein the data reading section is selectively inputted with the identification data of the directors one by one during the progress of the scenario.

It may be arranged that the data storing section comprises an exchangeable portable memory storing the plurality of presentation expressing data being linked with the identification data of the directors and the time element data.

It may be arranged that the image processing apparatus further comprises an image interface section which causes the display unit to display an image for selecting introduction data about a presentation feature of one of the directors and selecting the identification data of one of the directors.

According to another aspect of the present invention, there is provided a storage medium storing a program which is executable by a computer, the program allowing the computer to execute the steps of setting a plurality of presentation expressing data for performing image presentation expressions of different features relative to one scenario, so as to be selectively obtainable one by one during the progress of the scenario; producing, when one of the plurality of presentation expressing data is obtained, a CG image based on the obtained presentation expressing data; and displaying the produced CG image on a display unit.

It may be arranged that the storage medium is an exchangeable portable memory.

According to another aspect of the present invention, there is provided a storage medium storing a program which is executable by a computer, the program allowing the computer to execute the steps of setting a plurality of presentation expressing data for performing image presentation expressions of different features relative to one scenario, so as to be selectively obtainable one by one; obtaining one of the plurality of presentation expressing data during the progress of the scenario; producing a first CG image based on the obtained presentation expressing data; displaying the first CG image on a display unit; switching the obtained presentation expressing data to another of the plurality of presentation expressing data during the progress of the scenario; producing a second CC image based on the obtained another presentation expressing data; and displaying the second CC image on the display unit.

According to another aspect of the present invention, there is provided a storage medium storing a program which is executable by a computer, the program allowing the computer to execute the steps of setting common presentation expressing data for performing a common image presentation expression relative to a scenario and a plurality of presentation expressing data for performing image presentation expressions of different features relative to the scenario, so as to be selectively obtainable one by one; normally obtaining the common presentation expressing data, while obtaining one of the plurality of presentation expressing data when a given scenario scene is reached during the progress of the scenario; producing a CC image based on the obtained common presentation expressing data or the obtained one of the plurality of presentation expressing data; and displaying the produced CC image on a display unit.

According to another aspect of the present invention, there is provided a video game apparatus comprising a data storing section which stores a plurality of presentation expressing data for performing image presentation expressions of different features relative to one game scenario, the plurality of presentation expressing data being linked with identification data of directors who are producers of the image presentation expressions and with time element data relating to the progress of the game scenario; a data reading section which, using the identification data of one of the directors as key data, reads out corresponding one of the plurality of presentation expressing data from the data storing section; and a section which produces a game image based on the corresponding presentation expressing data read out by the data reading section, and displays the produced game image on a display unit, wherein the data reading section is selectively inputted with the identification data of the directors one by one during the progress of the game scenario.

According to another aspect of the present invention, there is provided a storage medium storing a game program which allows a computer to work as a video game apparatus when executed by the computer, the game program allowing the computer to execute the steps of setting a plurality of presentation expressing data for performing image presentation expressions of different features relative to one game scenario, so as to be selectively obtainable one by one during the progress of the game scenario; producing, when one of the plurality of presentation expressing data is obtained, a game image based on the obtained presentation expressing data; and displaying the produced game image on a display unit.

According to another aspect of the present invention, there is provided a storage medium storing a game program which allows a computer to work as a video game apparatus when executed by the computer, the game program allowing the computer to execute the steps of setting a plurality of presentation expressing data for performing image presentation expressions of different features relative to one game scenario, so as to be selectively obtainable one by one; obtaining one of the plurality of presentation expressing data during the progress of the game scenario; producing a first game image based on the obtained presentation expressing data; displaying the first game image on a display unit; switching the obtained presentation expressing data to another of the plurality of presentation expressing data during the progress of the game scenario; producing a second game image based on the obtained another presentation expressing data; and displaying the second game image on the display unit.

According to another aspect of the present invention, there is provided a storage medium storing a game program which allows a computer to work as a video game apparatus when executed by the computer, the game program allowing the computer to execute the steps of setting common presentation expressing data for performing a common image presentation expression relative to a game scenario and a plurality of presentation expressing data for performing image presentation expressions of different features relative to the game scenario, so as to be selectively obtainable one by one; normally obtaining the common presentation expressing data, while obtaining one of the plurality of presentation expressing data when a given scenario scene is reached during the progress of the game scenario; producing a game image based on the obtained common presentation expressing data or the obtained one of the plurality of presentation expressing data; and displaying the produced game image on a display unit.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described hereinbelow with reference to the accompanying drawings, wherein the present invention is applied to a video game apparatus.

In this embodiment, presentation expressing data including expression data for characters and variation data for background environments etc. are prepared in advance under the direction of different directors A, B and C according to the same game scenario, and stored in a CD-ROM as one example of a storage medium.

Further, in this embodiment, the characters, the background environments, etc. are formed by polygons, and movement of the characters and variation of the background environments etc. are realized by a program for moving coordinates or changing a shape of each polygon, the expression data and the variation data, all of which form the presentation expressing data. Accordingly, as opposed to movie format data commonly used in a personal computer, image data are not stored as they are.

The expression data are data for specifying viewing points, viewing angles, kinds of cameras (virtual), display sizes, zooming magnitudes, display timings, display time periods, etc. necessary for forming game images including characters. The variation data are data for specifying background environments etc., kinds and intensities of lighting, kinds of properties, kinds and magnitudes of sounds, etc. which can change following behavior of characters.

The presentation expressing data are stored so as to correspond to progress data of a game scenario and director identification data for identifying each of the directors, so that required presentation expressing data can be read out using these data as key data.

The foregoing correspondence between the data can be easily achieved by linking the data using time element data associated with the progress of the game scenario.

The CD-ROM also stores a program (program codes) which, cooperatively with a basic apparatus being a computer, constitutes a video game apparatus when read into the basic apparatus. Hereinafter, this program will be referred to as "game program". In the following description, it is assumed that the game program also includes data and control parameters necessary for execution thereof.

Figure 1:
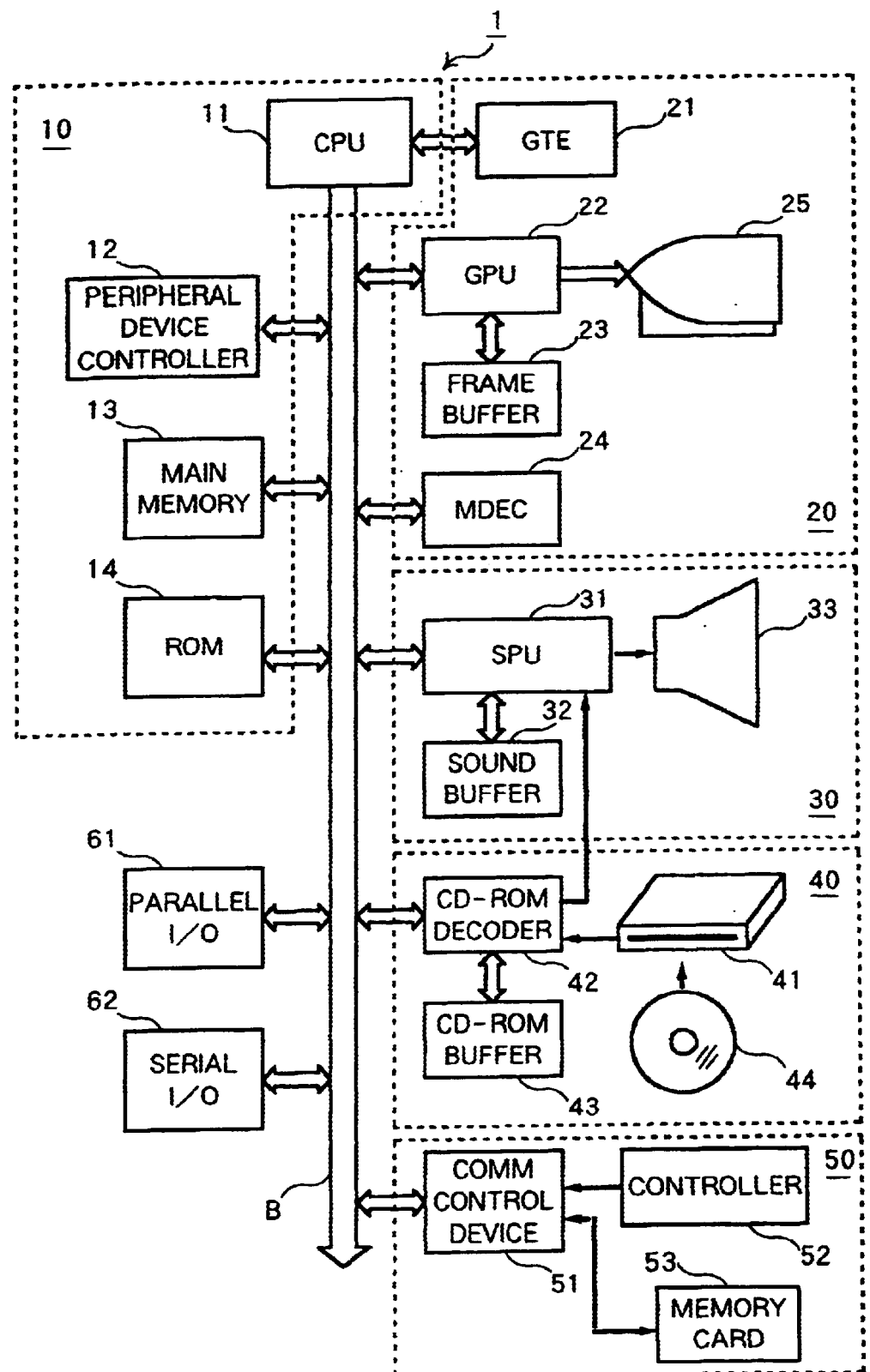
FIG. 1 is a block diagram showing a hardware structure of a basic apparatus to which the present invention is applied.

Referring now to FIG. 1, the basic apparatus for constituting the video game apparatus according to the preferred embodiment of the present invention will be first described hereinbelow. As the basic apparatus, one described in, for example, JP-A-8-2 12377 can be used.

The basic apparatus reads out the game program from the foregoing CD-ROM which is exchangeable and portable, and executes it so as to produce, display and control CG images.

As shown in FIG. 1, the basic apparatus 1 comprises a main control section 10, an image processing section 20, a sound processing section 30, a disk control section 40, a communication control section 50 and a main bus B connecting the foregoing functional blocks 10 to 50 to allow two-way communications among them.

The main control section 10 comprises a CPU 11, a peripheral device controller 12 for carrying out an interrupt control, a DMA (direct memory access) transfer control, etc., a main memory 13 for temporarily storing the game program and the presentation expressing data read out from the CD-ROM 44, and a ROM 14 storing an operating system (OS) etc. for managing the image processing section 20, the sound processing section 30, etc. The CPU 11 is a RISC (reduced instruction set computer) CPU, executing the OS stored in the ROM 14 to control the basic operation of the whole apparatus and further executing the game program stored in the main memory 13 to realize a plurality of functional blocks which will be described later.

The image processing section 20 comprises a geometry transfer engine (GTE) 21 carrying out high-speed coordinate transformation relative to data stored in the main memory 13 and so forth, a graphics processing unit (GPU) 22 for drawing three-dimensional CG images composed of combinations of polygons, such as triangles and quadrilaterals, and sprites (which will be included in the concept of polygons hereinafter) according to drawing commands from the CPU 11, a frame buffer 23 for temporarily storing the three-dimensional CG images drawn by the GPU 22, and an image decoder (MDEC) 24 for decoding compressed image data as requested. A display unit 25 reads out the three-dimensional CG images data stored in the frame buffer 23 and displays them.

By consecutively executing the drawing by the GPU 22 and the storing into the frame buffer 23, the three-dimensional CG images including motion image elements can be displayed on the display unit 25.

The sound processing section 30 comprises a sound processing unit (SPU) 31 for producing sound effects, voices, sounds, etc. according to background environment data about acoustics, a sound buffer 32 for temporarily storing sound effect data and other tone generator data, and a loudspeaker 33 for outputting the sound effects etc. produced at the SPU 31. The SPU 31 has an ADPCM decoding function of, for example, reproducing tone generator data subjected to adaptive differential pulse code modulation (ADPCM), a function of producing sound effects etc. by reproducing tone generator data stored in the sound buffer 32, a modulating function of modulating and reproducing tone generator data stored in the sound buffer 32, and so forth. Given such functions, the SPU 31 can be used as a sampling tone generator for producing sound effects etc. based on tone generator data stored in the sound buffer 32.

The disk control section 40 comprises a disk drive 41 for reproducing the game program, the presentation expressing data, etc. stored in the CD-ROM 44, a CD-ROM decoder 42 for decoding the reproduced data when error correcting codes (ECC) are added thereto, and a CD-ROM buffer 43 for temporarily storing the reproduced data from the disk drive 41 before storing them into the main memory 13. The CD-ROM decoder 42 constitutes a part of the sound processing section 30. An audio output from the CD-ROM decoder 42 is once inputted into the SPU 31 where it is mixed with an SPU output, and then inputted into a reverb unit so as to be a final audio output.

The communication control section 50 comprises a communication control device 51 for controlling communication with the CPU 11 via the main bus B, a controller 52 used for inputting commands from a game player, and a memory card 53 for storing the setting of a game etc.

The controller 52 is an interface for inputting commands from the player and includes a start key for commanding the start or restart of a game, a reset key for commanding the reset of the game, a selection key for commanding movement of a character in vertical and lateral directions and moving a cursor to desired one of menus or items, a command key for commanding detailed behavior of the character and commanding a selected menu, and so forth. The controller 52 transmits the state of each key to the communication control device 51 in synchronous communication.

The communication control device 51 notifies the state of each key of the controller 52 to the CPU 11. In this fashion, the commands from the player are given to the CPU 11 so that the CPU 11 performs an image displaying process and a game developing process based on the executing game program according to the commands from the player.

If the setting of a game progressing according to a game scenario, the final or intermediate result of the game or the like needs to be stored, the CPU 11 sends the necessary data to the communication control device 51 which then stores the data sent from the CPU 11 into the memory card 53. Since the memory card 53 is separated from the main bus B, it can be loaded or unloaded with the power being on. Accordingly, the setting of the game etc. can be stored in a plurality of memory cards 53.

The basic apparatus 1 further comprises a parallel input/output (I/O) port 61 and a serial input/output (I/O) port 62 connected to the main bus B, respectively. Connection to a peripheral device can be achieved via the parallel I/O port 61, while connection to another video game apparatus can be achieved via the serial I/O port 62.

In the foregoing basic apparatus 1, when the power gets on or a reset process is executed while the CD-ROM 44 is loaded in the disk drive 41, the CPU 11 executes the OS stored in the ROM 14 to first initialize the whole apparatus, then control the disk control section 40 to read out the game program stored in the CD-ROM 44 and transfer it into the main memory 13, and then execute it. In this event, the presentation expressing data are also read into the main memory 13 upon occasion. Through the execution of the game program, the CPU 11 realizes the functional blocks as shown in FIG. 2 so that the video game apparatus generally designated by numeral 2 is presented.

Figure 2:
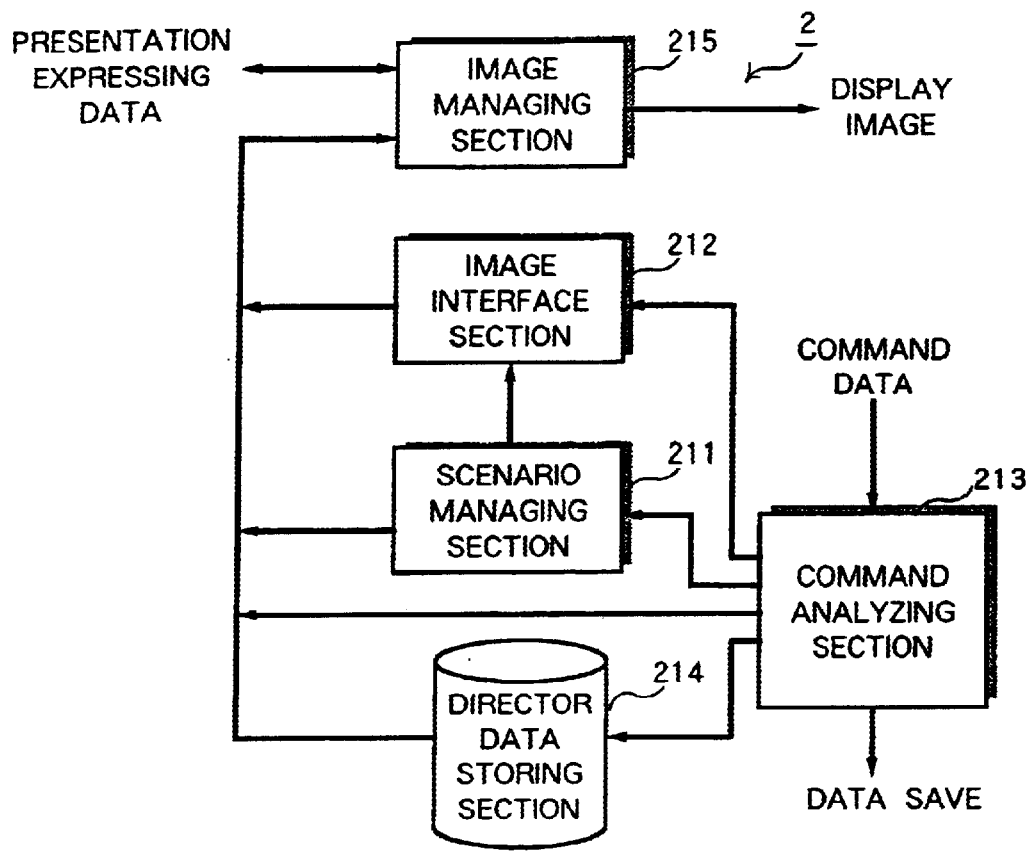
FIG. 2 is a functional block diagram of a video game apparatus according to a preferred embodiment of the present invention.

As shown in FIG. 2, the video game apparatus 2 comprises a scenario managing section 211, an image interface section 212, a command analyzing section 213, a director data storing section 214 and an image managing section 215.

The scenario managing section 211 monitors time elements after the start of the game and the state of execution of the game program so as to manage the progressing state of the game scenario. The image interface section 212 produces images of various menus and items for allowing the player to input his/her intentions via the controller 52 during the managed game scenario progress and sends them to the image managing section 215.

Figure 3:
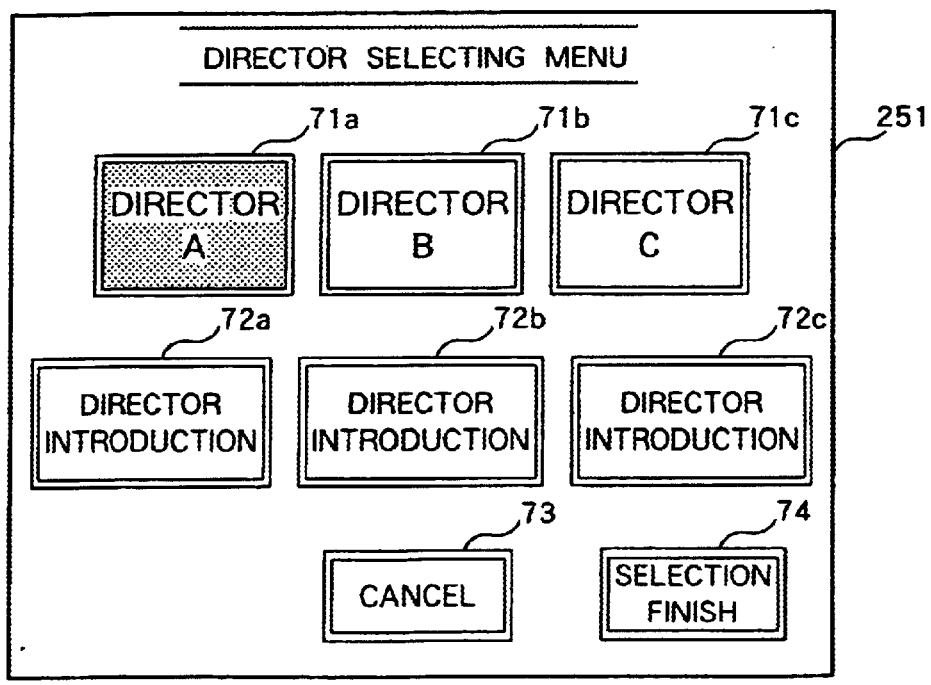
FIG. 3 is an explanatory diagram showing an image of a director selecting menu according to the preferred embodiment of the present invention.
Figure 5:
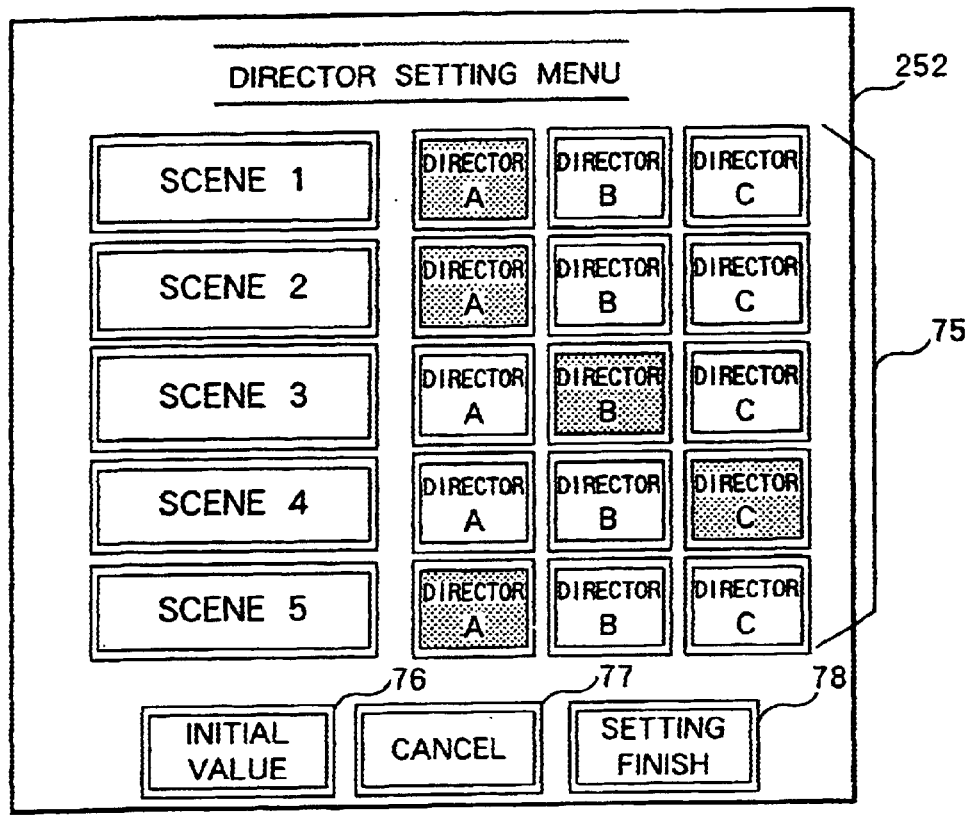
FIG. 5 is an explanatory diagram showing an image of a director setting menu according to a modification.

In this embodiment, the image interface section 212 produces, in addition to images of characters operated by the player, an image of a director selecting menu 251 as shown in FIG. 3 for selecting game images produced by a director desired by the player and an image of a director setting menu 252 as shown in FIG. 5. The director selecting menu 251 is displayed in a given scene of the game scenario, such as at the start of the game. The image interface section 212 further produces an image of an item which is displayed at a part of a game image at a given timing, such as at the time of development into a new scene or at the time of a climax. By moving a cursor to select this item, the director selecting menu 251 is displayed according to an intention of the player.

In FIG. 3, reference signs 71a to 71c represent director selecting buttons for selection among directors A to C, 72a to 72c selecting buttons for Introduction data introducing features of the presentation expressions of the respective directors A to C (for example, director A is gentle in camerawork, director B uses zooming frequently, director C uses many properties - - - ), 73 a cancel button for canceling the selection, and 74 a selection finish button for finalizing the selection. =The command analyzing section 213 analyzes command data inputted from the controller 52 via the communication control device 51 so as to execute required data controls. The command data include, for example, a command for displaying the director selecting menu 251, a command for director introduction, a command for director selection, a command for start/stop/restart/end of the game, a command for behavior of a player character, a command for selection of speech/ behavior of the player character and a command for item selection.

When the command for director introduction is inputted, the command analyzing section 213 causes the director data storing section 214 to send the corresponding introduction data to the image control section 215, so that the introduction data requested by the player is displayed on the display unit 25. When the command for director selection is inputted, the command analyzing section 213 sends identification data of the selected director to the image managing section 215.

Further, the command analyzing section 213 loads into the main memory 13 the game program from the CD-ROM 44 and the saved data from the memory card 53 upon detection of the start or restart of the game. Further, upon detection of the stop or end of the game, the command analyzing section 213 saves into the memory card 53 data representing the progressing state of the game and the current director as described above.

Using the director identification data sent from the command analyzing section 213 as key data, the image managing section 215 reads out the corresponding presentation expressing data from the CD-ROM 44 via the CD-ROM decoder 42. Then, the image managing section 215 produces CG images (game images) using the read-out presentation expressing data with the assistance of the GTE 21 and GPU 22 and displays them on the display unit 25. Further, the image managing section 215 displays upon occasion the director selecting menu 251, the director introduction data, the item for displaying the director selecting menu 251, etc. on the display unit 25.

Now, a game procedure in the foregoing video game apparatus 2 will be described with reference to a flowchart shown in FIG. 4.

Figure 4:
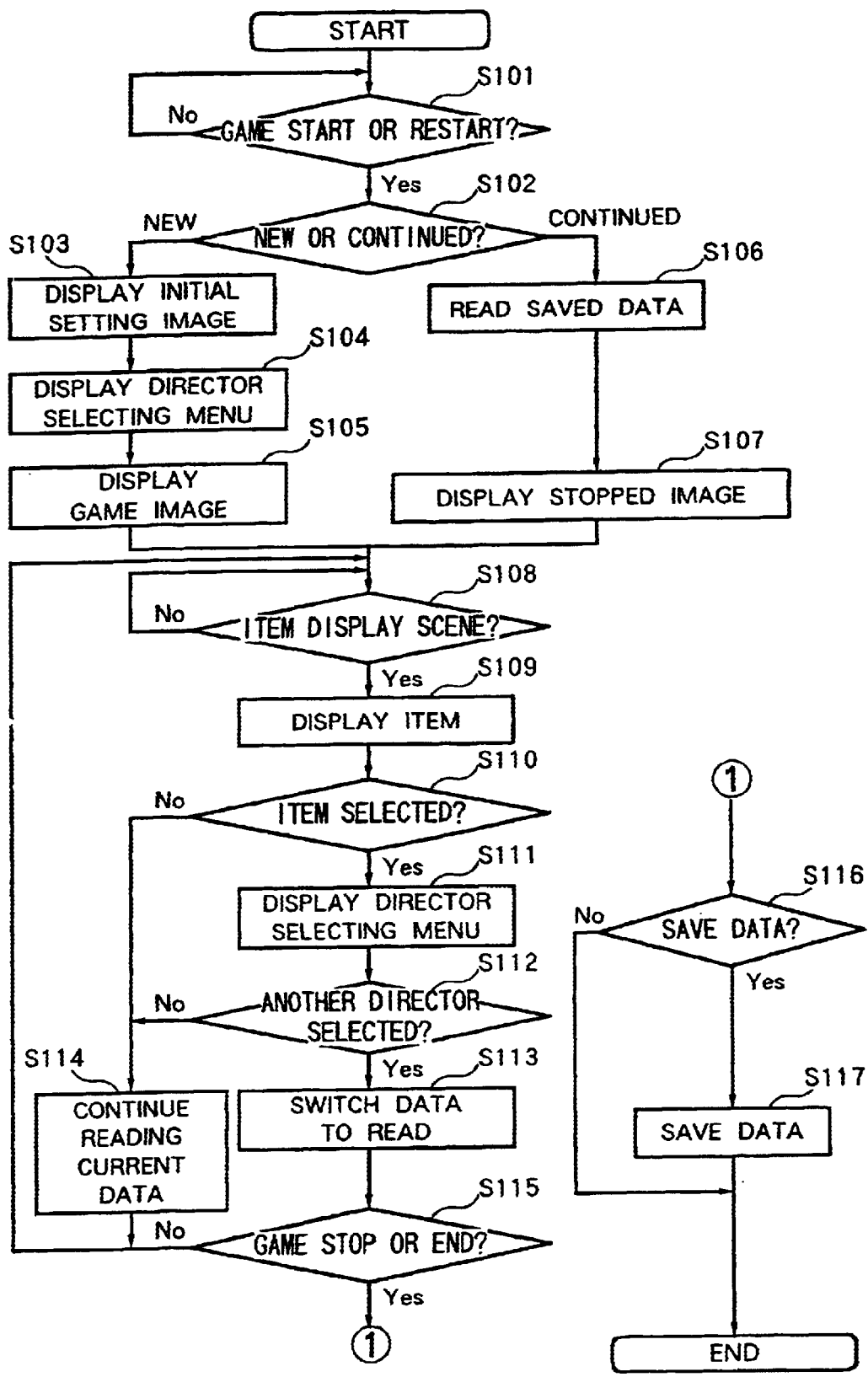
FIG. 4 is a flowchart showing a game procedure according to the preferred embodiment of the present invention.

In FIG. 4, when the start or restart of a game is commanded from the player via the controller 52 (Yes at step S101), the command analyzing section 213 judges whether it is a new game or a continued game (step S102). If it is the new game, the command analyzing section 213 notifies it to the image managing section 215 which then displays an image for Initial setting including a player registration step S103). Thereafter, the director selecting menu 251 shown in FIG. 3 is displayed (step S104) so as to allow the player to select a desired director. In this event, if the player selects one of the selecting buttons 72a to 72c, the corresponding director introduction data is displayed. The selection of one of the buttons on the director selecting menu 251 is carried out by moving a cursor to be on the corresponding button and then designating the selection finish button 74 on a display screen or on the controller 52.

If the player does not select the director, the first director (director A) is automatically selected as shown in FIG. 3.

When the director is selected, the image managing section 215 reads out the corresponding presentation expressing data from the CD-ROM 44 in order using identification data of the selected director as key data and produces game images for displaying on the display unit 25 (step S105). Now, the game is started.

On the other hand, if it is the continued game as judged at step S102, saved data relating to the subject player is read out from the memory card 53 (step S106) so that a game image corresponding to a director at the time of the interruption of the game is displayed (step S107). Accordingly, the player can restart the game from the time point of the interruption of the game.

As the game progresses according to a game scenario to reach a predetermined item display scene (Yes at step S108), the image managing section 215 displays the item for displaying the director selecting menu 251 (step S109).

If selection of the item by the player is detected (Yes at step S110), the director selecting menu 251 is displayed (step S111).

Then, if a director other than the current director is selected by the player on the director selecting menu 251 (Yes at step S112), the presentation expressing data to be read out from the CD-ROM 44 is switched (step S113). Specifically, using identification data of the selected director as key data, the image managing section 215 reads out corresponding presentation expressing data from the CD-ROM 44 and produces game images based on the presentation expressing data of the different director for displaying on the display unit 25. On the other hand, if the item is not selected at step S110 (No at step S110) or another director is not selected at step S112 (No at step S112), the presentation expressing data of the current director is continued to be read out from the CD-ROM 44 (step S114).

The foregoing processes are repeated until the stop or end of the game is commanded via the controller 52 (No at step S115).

If the stop or end of the game is commanded (Yes at step S115), data up to then is saved if necessary (steps S116, S117) and the routine is terminated.

In the foregoing game procedure, the director selecting menu 251 can be displayed per given scene. On the other hand, it may be arranged that the item for displaying the director selecting menu 251 is constantly displayed at a part of game images after the start of the game so that the player can switch the director arbitrarily.

Further, it may be arranged that game images produced by a plurality of directors are switched in sequence for displaying on the display unit 25. Specifically, as shown in FIG. 5, for example, an image of the director setting menu 252 for setting a director for each of scenes is prepared in advance at the image interface section 212, and the player sets a director per scene on the director setting menu 252 at the start of the game. Then, when each of the scenes is reached, identification data of the corresponding director is sent to the image managing section 215 from the scenario managing section 211. In FIG. 5, numeral 75 represents a region for setting the directors corresponding to the scenes, respectively.

Figure 6:
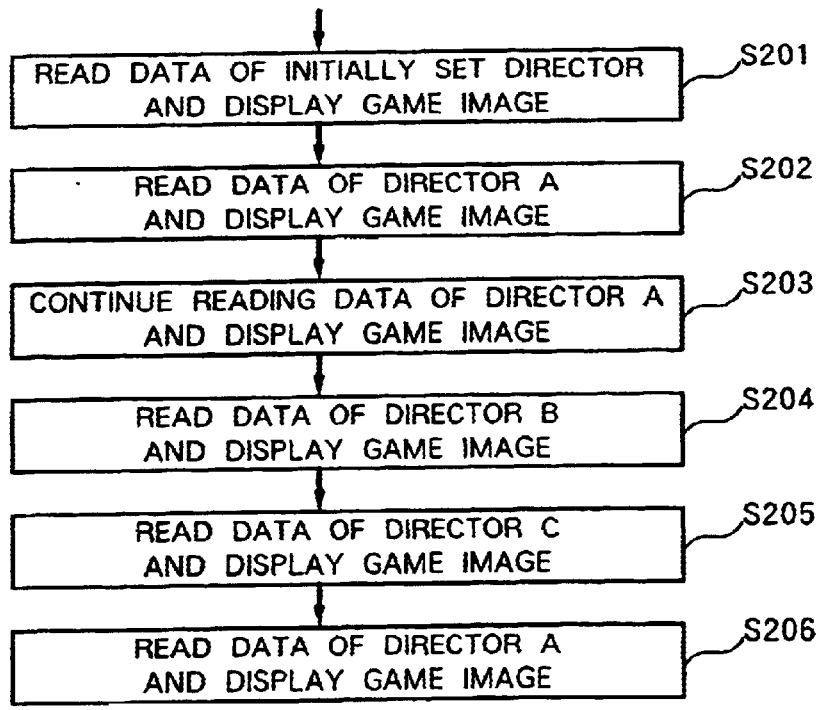
FIG. 6 is a diagram showing a sequence of switching of game images corresponding to the contents of the director setting menu shown in FIG. 5.

For example, in FIG. 5, a director A is used in Scenes 1 and 2, a director B is used in Scene 3, a director C is used in Scene 4, and the director A is used in Scene 5. FIG. 6 shows a sequence of displaying game images corresponding to FIG. 5. Specifically, presentation expressing data of the initially set director (director A) is first read out and game images are produced based on the read-out data and displayed (step S201). Then, presentation expressing data of the corresponding directors are automatically read out according to the contents of the director setting menu 252, and corresponding game images are produced and displayed on the display unit 25 (steps S202 to S206).

In FIG. 5, if an initial value setting button 76 is selected, the presentation expressing data of the initially set director continues to be read out irrespective of the contents of the director setting menu 252, so that the game images produced by the same director continue to be displayed. In FIG. 5, numeral 77 represents a cancel button for canceling the setting of the directors, and 78 a setting finish button for finalizing the setting of the directors.

As described above, in the video game apparatus 2 according to this embodiment, a plurality of presentation expressing data produced under the directions of different directors are stored so as to correspond to the game scenario and the identification data of the respective directors. When one of the directors is selected by the player, the presentation expressing data of the selected director is read out to produce the corresponding game images. Therefore, the player can enjoy the game images with the different presentation effects even if the game scenario is the same.

Further, since the presentation expressing data can be switched per given scene of the game scenario, game images produced by different directors can be enjoyed in the respective scenes.

Further, the presentation expressing data include programs and data for converting image elements in the form of polygons into images including three-dimensional motion image elements, and CG images are produced based on such presentation expressing data. Accordingly, even if it is designed to display CG images produced by many directors, the required memory capacity is not so increased. Therefore, the CG images produced in diversified expressing manners according to the same scenario can be reproduced from one CD-ROM. Further, the presentation expressing data of various directors can be stored in an exchangeable portable storage medium, such as the CD-ROM, per game scenario. Thus, by loading the storage medium into the basis apparatus 1 shown in FIG. 1, the video game apparatus 2 with diversified CG images can be easily realized.

As appreciated, the foregoing preferred embodiment is suitable for a case wherein the scenes of the game scenario progress while the player does not move the characters so aggressively.

However, the present invention is not limited thereto. Specifically, it may be possible to hold presentation expressing data produced by a plurality of directors, corresponding to only a part of a game scenario. More specifically, CG images are normally produced using only one kind of presentation expressing data (common presentation expressing data) prepared by a certain director and, only in a scene where the player is hardly allowed to operate behavior of the characters, presentation expressing data of one director is selected from those prepared by a plurality of directors.

The present invention is applicable to not only a video game apparatus as in the foregoing preferred embodiment, but also a reproducing apparatus of a CG movie. In case of the CG movie reproducing apparatus, since the processes following the player's operation of character behavior, required in the video game apparatus, are not required, the present invention can be carried out more easily. Like the video game apparatus, CG images produced in diversified expressing manners can be reproduced from one CD-ROM, and further, presentation expressing data of various directors can be stored in an exchangeable portable storage medium per scenario and, by loading the storage medium, a CG movie reproducing apparatus with diversified CG images can also be realized.

While the present invention has been described in terms of the preferred embodiment and the modifications thereof, the invention is not to be limited thereto, but can be embodied in various ways without departing from the principle of the invention as defined in the appended claims.

What is claimed is:

1. An image processing method comprising:
    storing a plurality of presentation expressing data for performing image presentation expressions of different features related to at least one of a plurality of scenes of a scenario, said plurality of presentation expressing data being linked with time element data relating to the progress of said scenario, wherein each of said plurality of presentation expressing data comprises a program for moving or changing a shape of a polygon, expression data associated with said polygon and variation data associated with said polygon, said program linked with said time element data and identification data of directors who are producers of said image presentation expressions;
    reading out selectively one of said plurality of presentation expressing data when displaying an image according to said time element data; and
    performing said image presentation expression on said image based on said read-out presentation expressing data, wherein said image is different for the same scene for each of the selected presentation expression data.

2. The image processing method according to claim 1, wherein said plurality of presentation expressing data are stored in an exchangeable portable memory.

3. The image processing method according to claim 1, wherein said image processing method further comprises:
    displaying an image for selecting identification data about a presentation feature of one of said directors, and
    selecting said identification data of one of said directors.

4. The image processing method according to claim 1, wherein said reading out of said plurality of presentation expressing data are varied so as to provide different image presentation expressions corresponding with said plurality of scenes, and wherein said correspondence between each of said scenes and one of said plurality of presentation expressing data is reset.

5. The image processing method according to claim 1, wherein said at least one scene is a game scene whose progress is stopped or restarted by a game player, and wherein said game scene is restarted based on one of said plurality of presentation expressing data which was read out when the progress of the game scene was stopped.

6. The image processing method according to claim 1, wherein said at least one scene is a movie scene, and wherein said image is a pseudo motion image performed according to said movie scene.

7. An image processing method comprising:
    storing a plurality of presentation expressing data for performing image presentation expressions of different features related to at least one of a plurality of scenes of a scenario, said plurality of presentation expressing data being linked with time element data relating to the progress of said scenario, wherein each of said plurality of presentation expressing data comprises a program for moving or changing a shape of a polygon, expression data associated with said polygon and variation data associated with said polygon, said program linked with said time element data and identification data of directors who are producers of said image presentation expressions;
    reading out a first of said plurality of presentation expressing data when displaying a first image according to said time element data;
    performing said image presentation expression on said image based on said read-out first presentation expressing data;
    reading out a second of said plurality of presentation expressing data when displaying a second image according to said time element data; and performing said image presentation expression on said second image based on said read-out second presentation expressing data, wherein at least one of said first and second images is different for the same scene for each of the selected presentation expression data.

8. The image processing method according to claim 7, wherein said plurality of presentation expressing data are stored in an exchangeable portable memory.

9. The image processing method according to claim 7, wherein said image processing method further comprises:
    displaying an image for selecting identification data about a presentation feature of one of said directors; and
    selecting the identification data of one of said directors.

10. The image processing method according to claim 7, wherein said reading out of said plurality of presentation expressing data are varied so as to provide different image presentation expressions corresponding with said plurality of scenes and wherein said correspondence between each of said scenes and one of said plurality of presentation expressing data is preset.

11. The image processing method according to claim 7, wherein said at least one scene is a game scene whose progress is stopped or restarted by a game player, and wherein said game scene is restarted based on one of said plurality of presentation expressing data which was read out when the progress of the game scene was stopped.

12. The image processing method according to claim 7, wherein said at least one scene is a movie scene, and wherein each of said images is a pseudo motion image performed according to said movie scene.

13. An image processing apparatus comprising:
    a data storing section for storing a plurality of presentation expressing data for performing image presentation expressions of different features related to at least one of a plurality of scenes of a scenario, said plurality of presentation expressing data being linked with identification data of directors who are producers of said image presentation expressions and with time element data relating to the progress of said scenario, wherein each of said plurality of presentation expressing data comprises a program for moving or changing a shape of a polygon, expression data associated with said polygon and variation data associated with said polygon, said program linked with said time element data and identification data of directors who are producers of said image presentation expressions;

a data reading section for reading out one of said plurality of presentation expressing data corresponding to one of said scenes from said data storing section using said identification data as key data, said identification data being selectively input to said data reading section during a progression of said plurality of scenes; and an image processing section which produces an image based on said readout presentation expressing data and displays said image on a display unit, wherein said image is different for the same scene for each of the selected presentation expression data.

14. The image processing apparatus according to claim 13, wherein said data storing section comprises an exchangeable portable memory for storing said plurality of presentation expressing data.

15. The image processing apparatus according to claim 13, further comprising an image interface section for displaying on said display unit an image for selecting introduction data about a presentation feature of one of said directors and for selecting said identification data of one of said directors.

16. The image processing apparatus according to claim 13, wherein said data reading section reads out said plurality of presentation expressing data in a varying manner so as to correspond with said plurality of scenes, and wherein said correspondence between each of said scenes and one of said plurality of presentation expressing data is preset.

17. The image processing apparatus according to claim 13, wherein said at least one scene is a game scene whose progress is stopped or restarted by a game player, and wherein the game scene is restarted based on one of said plurality of presentation expressing data which was read out when the progress of the game scene was stopped.

18. The image processing apparatus according to claim 13, wherein said at least one scene is a movie scene, and wherein said image is a pseudo motion image performed according to said movie scene.

19. A storage medium storing a program which is executable by a computer, said program allowing said computer to execute the steps of:

setting a plurality of presentation expressing data for performing image presentation expressions of different features related to at least one of a plurality of scenes of a scenario, so as to be selectively obtainable during a progression of said scenario, said plurality of presentation expressing data being linked with time element data relating to the progress of said scenario, wherein each of said plurality of presentation expressing data comprises a program for moving or changing a shape of a polygon, expression data associated with said polygon and variation data associated with said polygon, said program linked with said time element data and identification data of directors who are producers of said image presentation expressions;

producing an image based on said obtained presentation expressing data; and displaying said produced image on a display unit, wherein said image is different for the same scene for each of the selected presentation expression data.

20. The storage medium according to claim 19, wherein said storage medium is an exchangeable portable memory.

21. The storage medium according to claim 19, wherein said program further allows said computer to execute the steps of:

displaying on said display unit an image for selecting introduction data associated with a presentation feature of one of said directors, and selecting said identification data of one of said directors.

22. The storage medium according to claim 19, wherein said producing of said image based on said obtained presentation expressing data is varied so as to provide different image presentation impressions corresponding with said plurality of scenes and wherein said correspondence between each of said scenes and one of said plurality of presentation expressing data is preset.

23. The storage medium according to claim 19, wherein said at least one scene is a game scene whose progress is stopped or restarted by a game player, and wherein the game scene is restarted based on one of said plurality of presentation expressing data which was obtained when the progress of the game scene was stopped.

24. The storage medium according to claim 19, wherein said at least one scene is a movie scene, and wherein said image is a pseudo motion image performed according to said movie scene.

25. A storage medium storing a program which is executable by a computer, said program allowing said computer to execute the steps of:

setting a plurality of presentation expressing data for performing image presentation expressions of different features related to at least one of a plurality of scenes of a scenario, said plurality of presentation expressing data being linked with time element data relating to the progress of said scenario, wherein each of said plurality of presentation expressing data comprises a program for moving or changing a shape of a polygon, expression data associated with said polygon and variation data associated with said polygon, said program linked with said time element data and identification data of directors who are producers of said image presentation expressions;

obtaining a first of said plurality of presentation expressing data during the progression of said scenario;

producing a first image based on said first obtained presentation expressing data;

displaying said first image on a display unit;

switching from said first obtained presentation expressing data to a second obtained presentation expressing data during the progression of said scenario;

producing a second image based on said second obtained presentation expressing data; and displaying said second image on said display unit, wherein at least one of said first and second images is different for the same scene for each of the selected presentation expression data.

26. The storage medium according to claim 25, wherein said storage medium is an exchangeable portable memory.

27. The storage medium according to claim 25, wherein said program further allows said computer to execute the steps of:

displaying on said display unit an image for selecting introduction data associated with a presentation feature of one of said directors, and selecting said identification data of one of said directors.

28. The storage medium according to claim 25, wherein said step of switching is repeatedly performed, and wherein correspondence between each of said scenes and one of said plurality of presentation expressing data is preset.

29. The storage medium according to claim 25, wherein said at least one scene is a game scene whose progress is stopped or restarted by a game player, and wherein the game scene is restarted based on one of said plurality of presentation expressing data which was obtained when the progress of the game scene was stopped.

30. The storage medium according to claim 25, wherein said at least one scene is a movie scene, and wherein each of said first and second images is a pseudo motion image performed according to said movie scene.

31. A storage medium storing a program which is executable by a computer, said program allowing said computer to execute the steps of:

setting a set of common presentation expressing data for performing a common image presentation expression related to at least one of a plurality of scenes of a scenario;

setting a plurality of presentation expressing data for performing image presentation expressions of different features related to at least one of a plurality of scenes of said scenario, said plurality of presentation expressing data being linked with time element data relating to the progress of said scenario, wherein each of said plurality of presentation expressing data comprises a program for moving or changing a shape of a polygon, expression data associated with said polygon and variation data associated with said polygon, said program linked with said time element data and identification data of directors who are producers of said image presentation expressions;

obtaining said set of common presentation expressing data during the progression of scenes related to said common image presentation expression;

obtaining one of said plurality of presentation expressing. data when performing image presentation expressions of different features during said progression of said scenes;

producing a first image based on said obtained common presentation expressing data;

producing a second image based on said obtained one of said plurality of presentation expressing data; and displaying one of said first and second images on a display unit, wherein said second image is different for the same scene for each of the selected presentation expression data.

32. The storage medium according to claim 31, wherein said storage medium is an exchangeable portable memory.

33. The storage medium according to claim 31, said program further allows said computer to:

display on said display unit an image for selecting introduction data associated with a presentation feature of one of said directors, and select said identification data of one of said directors.

34. The storage medium according to claim 31, wherein said producing of said image based on said obtained presentation expressing data is varied so as to provide different image presentation expressions corresponding with said plurality of scenes and wherein said correspondence between each of said scenes and one of said plurality of presentation expressing data is preset.

35. The storage medium according to claim 31, wherein said at least one scene is a game scene whose progress is stopped or restarted by a game player, and wherein the game scene is restarted based on said common presentation expressing data or one of said plurality of presentation expressing data which was obtained when the progress of said game scene was stopped.

36. The storage medium according to claim 31, wherein said at least one scene is a movie scene, and wherein said image is a pseudo motion image, performed according to said movie scene.

37. An image processing method comprising: storing a plurality of presentation expressing data for performing image presentation expressions of different features related to at least one of a plurality of scenes of a scenario, said plurality of presentation expressing data being linked with time element data relating to the progress of said scenario; reading out selectively one of said plurality of presentation expressing data when displaying an image according to said time element data; and performing one of said image presentation expressions on said image based on said read-out presentation expressing data, wherein each of said plurality of presentation expressing data comprises a program for moving or changing a shape of a polygon, expression data associated with said polygon and variation data associated with said polygon, said program linked with said time element data and identification data of directors who are producers of said image presentation expressions, and wherein said expression data of said polygon includes a specified viewing point.

38. An image processing method comprising: storing a plurality of presentation expressing data for performing image presentation expressions of different features related to at least one of a plurality of scenes of a scenario, said plurality of presentation expressing data being linked with time element data relating to the progress of said scenario; reading out selectively one of said plurality of presentation expressing data when displaying an image according to said time element data; and performing one of said image presentations expression on said image based on said read-out presentation expressing data, wherein each of said plurality of presentation expressing data comprises a program for moving or changing a shape of a polygon, expression data associated with said polygon and variation data associated with said polygon, said program linked with said time element data and identification data of directors who are producers of said image presentation expressions, and wherein said expression data of said polygon includes a specified zooming magnitude.

39. An image processing method comprising: storing a plurality of presentation expressing data for performing image presentation expressions of different features related to at least one of a plurality of scenes of a scenario, said plurality of presentation expressing data being linked with time element data relating to the progress of said scenario; reading out selectively one of said plurality of presentation expressing data when displaying an image according to said time element data; and performing one of said image presentation expressions on said image based on said read-out presentation expressing data, wherein each of said plurality of presentation expressing data comprises a program for moving or changing a shape of a polygon, expression data associated with said polygon and variation data associated with said polygon, said program linked with said time element data and identification data of directors who are producers of said image presentation expressions, and wherein said variation data includes a specified lighting intensity.

40. An image processing method comprising: storing a plurality of presentation expressing data for performing image presentation expressions of different features related to at least one of a plurality of scenes of a scenario, said plurality of presentation expressing data being linked with time element data relating to the progress of said scenario; reading out selectively one of said plurality of presentation expressing data when displaying an image according to said time element data; and performing one of said image presentation expressions on said image based on said read-out presentation expressing data, wherein each of said plurality of presentation expressing data comprises a program for moving or changing a shape of a polygon, expression data associated with said polygon and variation data associated with said polygon, said program linked with said time element data and identification data of directors who are producers of said image presentation expressions, and wherein said variation data includes a specified sound magnitude.

41. An image processing method comprising: storing a plurality of presentation expressing data for performing image presentation expressions of different features related to at least one of a plurality of scenes of a scenario, said plurality of presentation expressing data being linked with time element data relating to the progress of said scenario; reading out a first of said plurality of presentation expressing data when displaying a first image according to said time element data; performing said image presentation expression on said image based on said read-out first presentation expressing data; reading out a second of said plurality of presentation expressing data when displaying a second image according to said time element data; and performing said image presentation expression on said second image based on said readout second presentation expressing data, wherein each of said plurality of presentation expressing data comprises a program for moving or changing a shape of a polygon, expression data associated with said polygon and variation data associated with said polygon, said program linked with said time element data and identification data of directors who are producers of said image presentation expressions, and wherein said expression data of said polygon includes a specified viewing point.

42. An image processing method comprising: storing a plurality of presentation expressing data for performing image presentation expressions of different features related to at least one of a plurality of scenes of a scenario, said plurality of presentation expressing data being linked with time element data relating to the progress of said scenario; reading out a first of said plurality of presentation expressing data when displaying a first image according to said time element data; performing said image presentation expression on said image based on said read-out first presentation expressing data; reading out a second of said plurality of presentation expressing data when displaying a second image according to said time element data; and performing said image presentation expression on said second image based on said readout second presentation expressing data, wherein each of said plurality of presentation expressing data comprises a program for moving or changing a shape of a polygon, expression data of said polygon and variation data associated with said polygon, said program linked with said time element data and identification data of directors who are producers of said image presentation expressions, and wherein said expression data of said polygon includes a specified zooming magnitude.

43. An image processing method comprising: storing a plurality of presentation expressing data for performing image presentation expressions of different features related to at least one of a plurality of scenes of a scenario, said plurality of presentation expressing data being linked with time element data relating to the progress of said scenario; reading out a first of said plurality of presentation expressing data when displaying a first image according to said time element data; performing said image presentation expression on said image based on said read-out first presentation expressing data; reading out a second of said plurality of presentation expressing data when displaying a second image according to said time element data; and performing said image presentation expression on said second image based on said readout second presentation expressing data, wherein each of said plurality of presentation expressing data comprises a program for moving or changing a shape of a polygon, expression data associated with said polygon and variation data associated with said polygon, said program linked with said time element data and identification data of directors who are producers of said image presentation expressions, and wherein said variation data includes a specified lighting intensity.

44. An image processing method comprising storing a plurality of presentation expressing data for performing image presentation expressions of different features related to at least one of a plurality of scenes of a scenario, said plurality of presentation expressing data being linked with time element data relating to the progress of said scenario; reading out a first of said plurality of presentation expressing data when displaying a first image according to said time element data; performing said image presentation expression on said image based on said read-out first presentation expressing data; reading out a second of said plurality of presentation expressing data when displaying a second image according to said time element data; and performing said image presentation expression on said second image based on said readout second presentation expressing data, wherein each of said plurality of presentation expressing data comprises a program for moving or changing a shape of a polygon, expression data associated with said polygon and variation data associated with said polygon, said program linked with said time element data and identification data of directors who are producers of said image presentation expressions, and wherein said variation data includes a specified sound magnitude.

45. An image processing apparatus configured to operate as a videogame apparatus, said apparatus comprising: a data storing section for storing a plurality of presentation expressing data for performing image presentation expressions of different features related to at least one of a plurality of scenes of a scenario, said plurality of presentation expressing data being linked with identification data of directors who are producers of said image presentation expressions and with time element data relating to the progress of said scenario; a data reading section for reading out one of said plurality of presentation expressing data corresponding to one of said scenes from said data storing section using said identification data as key data, said identification data being selectively input to said data reading section during a progression of said plurality of scenes; and an image processing section which produces an image based on said readout presentation expressing data and displays said image on a display unit.

46. The storage medium according to claim 25, wherein said computer is configured to operate as a video game apparatus.

47. The storage medium according to claim 31, wherein said computer is configured to operate as a video game apparatus.

* * * * *

UNITED STATES PATENT AND TRADEMARK OFFICE
CERTIFICATE OF CORRECTION

PATENT NO.    : 6,633,293 B1
DATED         : October 14, 2003
INVENTOR(S)   : Hideo Kojima It is certified that error appears in the above-identified patent and that said Letters Patent is hereby corrected as shown below:

Column 6,
Line 7, "JP-A-8-2 12377" should read -- JP-A-8-212377 --.

Column 8,
Line 29, insert a paragraph break after "selection."

Column 15,
Line 58, after "claim 31," insert -- wherein --.

Column 17,
Lines 32 and 55, "readout" should read -- read-out --.

Column 18,
Lines 11 and 34, "readout" should read -- read-out --.

Signed and Sealed this

Ninth Day of December, 2003

JAMES E. ROGAN
*Director of the United States Patent and Trademark Office*